DOMAIN WALL SHIFT REGISTER INCLUDING A BUFFER STORAGE POSITION

Filed March 4, 1966 Sheet 1 of 7

INVENTOR
J. L. SMITH
BY Herbert M. Shapiro
ATTORNEY

DOMAIN WALL SHIFT REGISTER INCLUDING A BUFFER STORAGE POSITION

Filed March 4, 1966

June 24, 1969 J. L. SMITH 3,452,341

DOMAIN WALL SHIFT REGISTER INCLUDING A BUFFER STORAGE POSITION

Filed March 4, 1966 Sheet 7 of 7

United States Patent Office 3,452,341
Patented June 24, 1969

3,452,341
DOMAIN WALL SHIFT REGISTER INCLUDING A BUFFER STORAGE POSITION
James L. Smith, Bedminster, N.J., assignor to Bell Telephone Laboratories, Incorporated, New York, N.Y., a corporation of New York
Filed Mar. 4, 1966, Ser. No. 531,885
Int. Cl. G11b 5/62
U.S. Cl. 340—174 11 Claims

ABSTRACT OF THE DISCLOSURE

A shift register including a magnetic medium is operated as a buffer store. Magnetic domains are moved along the medium by two distinct propagation implementations, one operative in a write portion of the medium, the other in the read portion, and both in an intermediate portion therebetween.

This invention relates to magnetic circuits and, more particularly, to such circuits which convert information from one form to another.

Information converters are used, for example, to convert multifrequency input information to dial pulses thus making pushbutton type telephones compatible with existing central offices. The function of such a converter, in this context, includes the reception and the translation of the multifrequency signal to a one-out-of-ten (or other *n* out of *m*) code and the conversion of the code into a corresponding number of dial pulses for each multifrequency pulsed digit.

Frequently, in practice, coded input information is converted to positional information in a register and pulses are generated at the output of that register as the information is advanced therethrough. Always, the information is written into the register at a rate different from that at which it is read out. This is due to the fact that central office swiching equipment accepts dial pulses at a first predetermined rate whereas the register receives pulses at a second rate, higher than the first rate, determined by the subscriber. A buffer store permits independent write and read-out rates as is described, for example, in L. A. Hohman, Patent No. 2,933,563, issued Apr. 19, 1960. Buffer stores, however, are expensive pieces of equipment comprising typically, a word-organized magnetic memory with read and write registers.

An object of this invention is to provide a new and novel converter with independent write and read-out rates.

The foregoing and further objects and features of this invention are realized in one embodiment thereof wherein a magnetic domain wall device is turned to account. Domain wall devices, conveniently, comprise a magnetic medium, typically a wire, of a material characterized by the ability to maintain a reverse (magnetized) domain therein in response to a first magnetic field in excess of a nucleation threshold and the ability to move that domain therealong in response to a second field in excess of a propagation threshold and less than the nucleation threshold. The second fields are frequently provided by pulses applied alternately to first and second interleaved propagation conductors coupled to spaced apart positions along the wire. In accordance with the present invention, overlapping first and second sets of propagation conductors, driven by separate drivers, are employed to define a buffer portion (store) in the magnetic wire. The first set of propagation conductors couples a write portion and the buffer portion of the wire. The second set of propagation conductors couples a read portion and the buffer portion of the wire. In response to a coded input signal, information is stored as a pair of reference domains and a position coded domain in the write portion of the wire and then advanced to the buffer portion of the wire. Information is advanced to the read portion of the wire in response to each read signal for providing an (dial) output pulse. Output pulses are enabled by the arrival of reference domains at a read position and are inhibited by the arrival of the corresponding position-coded domain at that read position.

Accordingly, a feature of this invetnion is a domain wall device comprising a magnetic wire and first and second propagation means overlapping one another along a portion of the wire for defining a buffer "store" there.

The invention and the various objects and features thereof will be understood more fully from a consideration of the following detailed description rendered in conjunction with the accompanying drawing, wherein.

Figure 1:
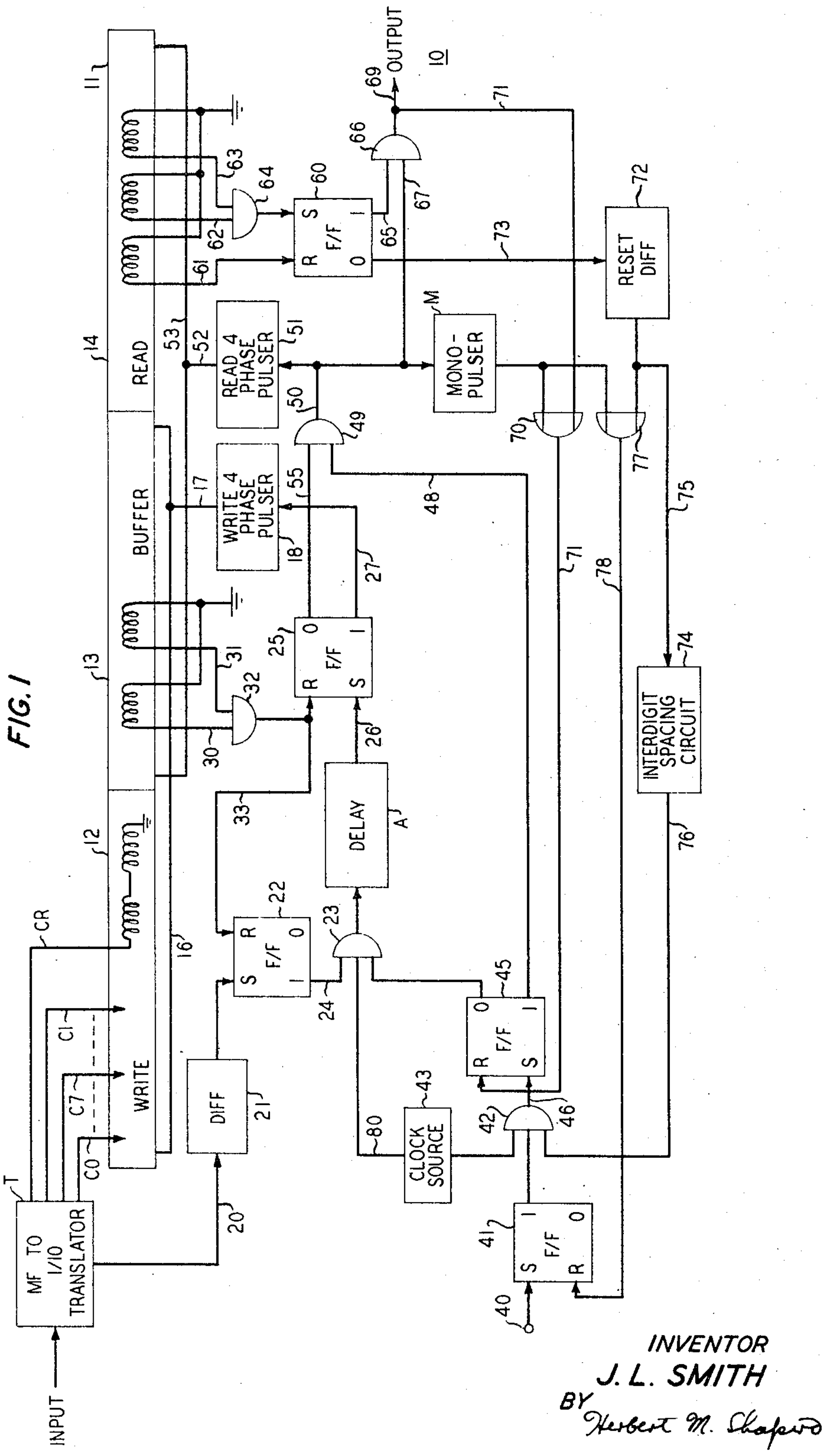
FIG. 1 is a schematic illustration of a converter in accordance with this invention.

FIG. 1, specifically, shows a converter 10 in accordance with this invention. The converter comprises a magnetic domain wall wire represented by a block (wire) 11 shown divided into write, buffer, and read portions designated 12, 13, and 14, respectively. The remainder of the converter circuitry is most easily described in terms of blocks of circuitry associated with the different portions of the magnetic wire.

*Write portion*

A multifrequency (MF) to one-out-of-ten (1/10) translator T is shown illustratively as the input to the converter of FIG. 1. Such a translator activates one of ten coded conductors, designated C1 to C0 in response to an MF code as is well known. Each of conductors C1 to C0 terminates in a coil (grounded) which couples a different bit position in the write portion of the domain wall wire. This coupling is indicated in FIG. 1 by the arrowheads in which representative ones of those conductors are shown to terminate. A reference conductor designated CR is also activated in response to each input. Conductor CR terminates in two series connected coils (grounded) which couple two consecutive bit positions in the write portion of the domain wall wire spaced apart one position from that coupled by the nearest one of the coded conductors. Thus one of ten conductors plus a reference conductor are selectively activated in response to an input signal. When activated, those conductors provide stable reverse magnetized domains in the positions coupled by the reference conductor and in the one-out-of-ten positions coupled by the activated (coded) conductor.

The portion of wire 11 in which those domains are initially stored is referred to as the write portion of wire 11. The spacing (number of bit positions) between the "reference" domains and the "coded" domain is indicative of the input code. The term "position" and the use thereof herein will become clear hereinafter. Suffice it to say at this point that a "position" designates a bit location of a reverse domain in wire 11.

*Write and buffer portions*

The write and buffer portions of the magnetic wire are provided with a common first propagation means comprising interleaved first and second propagation conductors each including a set of spaced apart coils, each set having alternating coupling senses. The propagation means also includes a four-phase driver, as is well known.

The conductors are represented symbolically in FIG. 1 by a line designated 16 connected by line 17 to write four-phase pulser 18 and are described more fully hereinafter.

Write pulser 18 is gated on in response to a write pulse, via a conductor 20, from translator T in response to an input signal. The gating of pulser 18 is contingent on certain conditions determined by the logic circuitry in the path from translator T to pulser 18. That path comprises a differentiator 21 for providing a voltage level, in response to the trailing edge of the pulse from the translator T, for setting a flip-flop 22. The differentiator provides a delay to permit ample input time. The set output of flip-flop 22 is connected to an input of an AND circuit 23 via a conductor designated 24. The output of AND circuit 23 is connected to the set input of a flip-flop 25, via a delay line A and a conductor 26, for setting flip-flop 25 when activated. The set output of flip-flop 25 is connected to (gated) pulser 18, via a conductor designated 27, providing an (positive) output for the activation thereof so long as flip-flop 25 is in the set condition. In response to a pulse from translator T on conductor 20, then, flip-flop 22 is set, and flip-flop 25 is set (and remains set) if AND circuit 23 is enabled. The enablement of AND circuit 23 is discussed in connection with the circuitry associated with the buffer and read portions of the domain wall wire and will be seen to operate to inhibit pulser 18 if a write command is received during a read operation.

Two adjacent bit locations in the buffer portion 13 of domain wall wire 11 are coupled electrically in parallel by conductors 30 and 31. Conductors 30 and 31 are connected between inputs to an AND circuit 32 and ground. The output of AND circuit 32 is connected, via conductor 33, in parallel to the reset inputs of flip-flops 22 and 25 for resetting the two flip-flops when activated.

It will be appreciated that write pulser 18 is normally activated in response to a pulse from translator T (via flip-flop 25) for advancing stored reverse domains from the write portion of domain wall wire 11 to the buffer portion. A coded input signal, from a subscriber subset, not shown, nucleates position coded and a reference domain pair to be so advanced. When the reference domains arrive at the positions in the buffer portion of wire 11 coupled by conductors 30 and 31, they generate pulses in those conductors for activating AND circuit 32 which, in turn, provides a pulse for resetting flip-flops 22 and 25. Write pulser 18, operating in four-phase cycles when activated (via flip-flop 25) by a pulse from translator T, terminates at the end of the fourth phase of its current operating cycle when flip-flop 25 is reset. The couplings of conductors 30 and 31 are positioned to correspond to the last pulse of a propagation sequence in order to reset flip-flops 22 and 25 at the end of a propagation sequence.

*Buffer and read portions*

At some predetermined rate compatible with telephone central office requirements, digit-accept pulses are applied at 40 from the central office equipment (not shown) to the set input of a flip-flop 41 for setting the latter. The set output of flip-flop 41 is connected to an input of an AND circuit 42. A clock source 43 also is connected to an input of AND circuit 42. The output of AND circuit 42 is connected to the set input of flip-flop 45 via a conductor 46 for setting the flip-flop when AND circuit 42 is activated. The set output of flip-flop 45 is connected by means of conductor 48 to an input of an AND circuit 49 the output of which is connected via conductor 50 to a read four-phase pulser 51. The read pulser 51 is shown connected, via line 52, to interleaved first and second propagation conductors symbolically represented by a line designated 53, associated with the buffer and read portions of domain wall wire 11. The propagation conductors symbolized in FIG. 1 by line 53 and pulser 51 comprise the means for propagating reverse domains from the buffer portion to the read portion of the domain wall wire 11. That means operates independently of the similar propagating means, serving the same function for the write and buffer portions as described hereinbefore.

The enablement of AND circuit 23 (in the write portion of the circuitry) is dependent on a reset condition of flip-flop 45 (and on clock source 43 as will be described hereinafter) to insure that a read operation is not in progress when a write operation is initiated. To this end, the reset output of flip-flop 45 is connected to an input of AND circuit 23 for providing a positive voltage thereto when flip-flop 45 is in the reset condition. Similarly, the enablement of AND circuit 49 is dependent on the reset condition of flip-flop 25 to insure just the opposite. An input of AND circuit 49 is shown connected to the reset output of flip-flop 25 by means of a conductor 55 to this end.

The buffer portion of the register includes a sufficient number of bit positions so that a complete telephone number may be represented therein. Successive digit representations of that number are stored as described, resetting flip-flops 22 and 25 when the associated reference domains (for each digit) pass the positions coupled by conductors 30 and 31. If no read out is called for between inputs, previously stored information is advanced in response to succeeding write pulses on conductor 20 to fill the buffer "store." A next pulse from clock source 43 causes all information stored in the buffer to advance, to the read portion of wire 11, all information as described.

*Read portion*

It is clear at this juncture in the description that information is stored as two reference reverse domains in adjacent bit positions followed by a reverse domain spaced apart from the reference domains a number of bit positions indicative of the input code. It is known that reverse domains are not actually adjacent one another in a domain wall device. Rather, adjacent reverse domains are spaced apart by a region, typically as long as a reverse domain in which the magnetization is opposite to that of the reverse domain. The term "buffer region" designates the spacing between two bit positions in a domain wall device and is known to correspond to a position in the magnetic medium two propagation pulses out of phase with bit positions (locations) which are four propagation pulses apart. This will become clearer from the discussion of the propagation means in connection with FIG. 2. The term "buffer region" is to be distinguished from "buffer portion" of the domain wall wire.

The reset input of a flip-flop 60 is coupled, conveniently, to a buffer region (for reasons which will become clear) in the read portion of the domain wall wire via a conductor 61 which terminates at ground. Two adjacent bit positions, spaced apart one position from that coupled by conductor 61, in the read portion of the domain wall wire are coupled by conductors 62 and 63. Conductors 62 and 63 are connected between inputs to an AND circuit 64 and ground. The output of AND cricuit 64 is connected to the set input of flip-flop 60 for setting the latter when activated. The set output of flip-flop 60 is connected, via a conductor 65, to an input of AND circuit 66. Another input of AND circuit 66 is connected, via conductor 67, to the output of AND circuit 49. Thus, when a digit-accept command (at 40) sets flip-flop 45 (as described) and activates AND circuit 49, AND circuit 66 is enabled. When reference domains of the representation of a digit couple conductors 62 and 63, flip-flop 60 is set and (enabled) AND circuit 66 provides a single output pulse at 69 (for the central office). That output pulse also resets flip-flop 45 via an OR circuit 70 and a conductor 71 for enabling the advance into the buffer portion of any additional input information.

It is clear from FIG. 1 that reverse domains are propagated from left to right as viewed. Consequently, each reverse domain induces a pulse in conductor 61 resetting flip-flop 60, and only when the two reference domains of a digit representation concurrently couple conductors 62 and 63 is flip-flop 60 set for activating AND circuit 66 to provide a single output pulse. An output pulse is provided then in response to each pulse from clock source 43 (setting flip-flop 45) until the position coded domain in the representation of a digit couples conductor 61 for resetting flip-flop 60.

A reset differentiator 72 is connected between flip-flop 60 and an interdigit spacing circuit 74 via conductors 73 and 75, respectively. Interdigit spacing circuit 74 in turn is connected to an input of AND circuit 42 via a conductor 76. Normally, interdigit spacing circuit 74 provides a pulse level necessary for enabling AND circuit 42. When flip-flop 60 is reset in response to a (coded) reverse domain coupling conductor 61, differentiator 72 pulses interdigit spacing circuit 74 to a no-output condition and AND circuit 42 is disabled. Consequently, no read command is accepted during the period of the interdigit spacing which may be arbitrarily long.

Reset differentiator 72 also is connected to an input of an OR-circuit 77 the output of which is connected to the reset input of flip-flop 41 for resetting flip-flop 41 simultaneously with the activation of interdigit spacing circuit 74. In this manner, flip-flop 41 is prepared to accept a next digit-accept command from the central office.

A monopulser M is connected between the output of AND circuit 49 and an input to OR circuit 70. Should a digit-accept command appear when the domain wall wire 11 is clear of information, monopulser M provides a pulse which operates, as does an output pulse, to reset flip-flop 45 in order to permit additional inputs. In addition, monopulser M is connected to an input of OR circuit 77 for resetting flip-flop 41 when the former provides a pulse. Monopulser M is timed to provide a pulse after a time sufficient to permit the provision of a single output pulse, as described, were information present in wire 11.

Clock source 43 periodically (i.e., ten times a second) pulses AND circuit 42 as has been stated hereinbefore. Normally, clock source 43 provides a positive output, enabling AND circuit 23 to which end a connection 80 is provided therebetween. The clock source, then, operates in a push-pull fashion normally to enable AND circuit 23 and disable AND circuit 42 but, alternatively, to enable AND circuit 42 and disable AND circuit 23. Such operation avoids the possibility of requiring the circuit of FIG. 1 to respond to concurrent write and digit-accept commands. To this end, clock 43 is, conveniently, an asymmetric free-running multivibrator.

The various logic circuits, clocks, differentiators and other elements shown in FIG. 1 may be any such elements capable of functioning in accordance with this invention.

The circuit of FIG. 1 is intended primarily for use in connection with subscriber subsets in a telephone system although the operation thereof is not limited to such a context. Accordingly, the utility of such a circuit is amply demonstrated by a description of the processing of a representative telephone number thereby. Such an operation is now described for a representative telephone number 722–2513.

Figure 2:
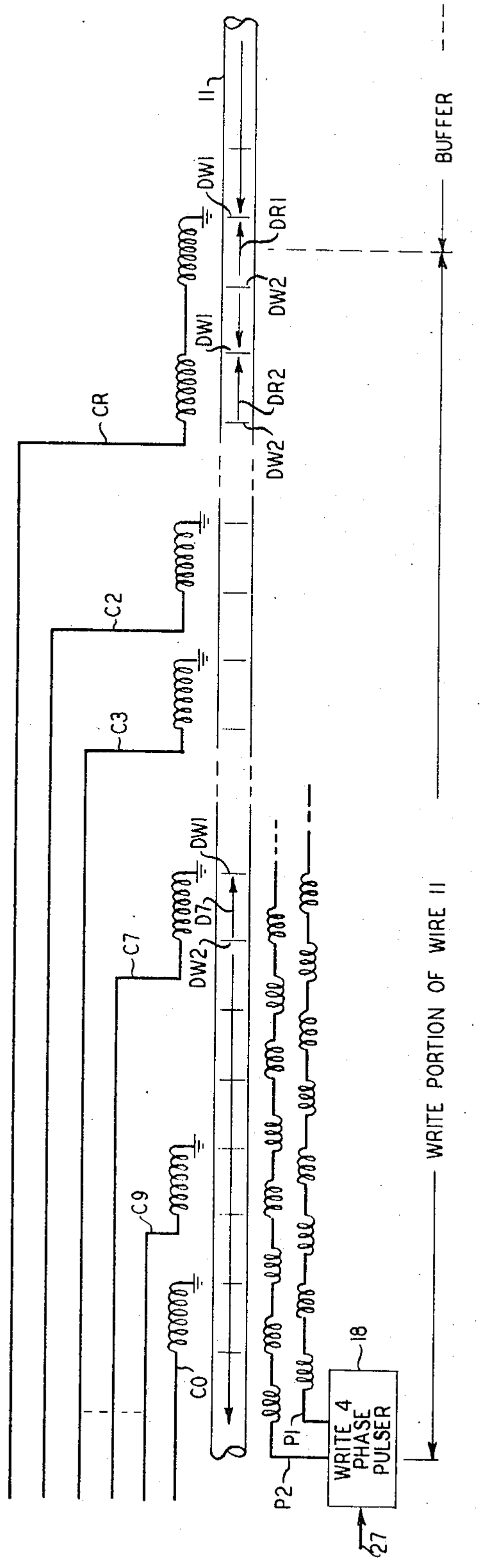
FIGS. 2 through 10 are schematic illustrations of portions of the converter of FIG. 1 showing flux patterns therein.

FIG. 2 shows, in detail, the write and buffer portions of the domain wall wire 11 of FIG. 1. Each of the input conductors C has a numeral designation associated with it. That designation corresponds to the position of the coded reverse domain provided by the activation thereof. Each position is four propagation pulses from the next adjacent position as is well known. The propagation conductors, indicated symbolically by line 16 in FIG. 1, are indicated by conductors, designated P1 and P2, just beneath the representation of wire 11 in FIG. 2. Although those conductors are shown spaced apart from wire 11, they include sets of coils which couple wire 11. It is noted that the sense of the coils alternates. The magnetic wire 11 is assumed initialized to a forward (magnetized) direction indicated by arrows directed to the left in FIG. 2. A reverse domain is indicated by an arrow directed to the right defining leading and trailing domain walls DW1 and DW2, respectively, with the forward domains.

In operation, a subscriber subset is taken off-hook and a pushbutton is depressed. In response, MF to 1/10 translator T is activated as indicated by the arrow designated "input" in FIG. 1. In accordance with the assumed illustrative operation, translator T pulses conductors C7 and CR thereby nucleating reverse domains at each of the couplings between those conductors and wire 11. The result is depicted in FIG. 2. For convenience, the reference domains are designated DR1 and DR2, and the coded domain is designated D$n$ where $n$ is the number of positions (less one) the coded domain is removed from the position of domain DR2. The additional position provided between reference domain DR2 and a coded domain D1 is to insure that those two domains are not mistaken for two reference domains in the output portion of the circuit as will become clear Translator T, concurrently, provides a pulse on conductor 20 (FIG. 1). Assume that a read operation is not in progress at this instance. Then flip-flop 45 is in a reset condition and AND circuit 23 is enabled. Thus, each pulse on conductor 20 (the trailing edge thereof) sets flip-flop 22 and flip-flop 25. The output of flip-flop 25 activates (and continues to activate) write pulser 18 for propagating stored domains through the write and buffer portions of wire 11.

Figure 3:
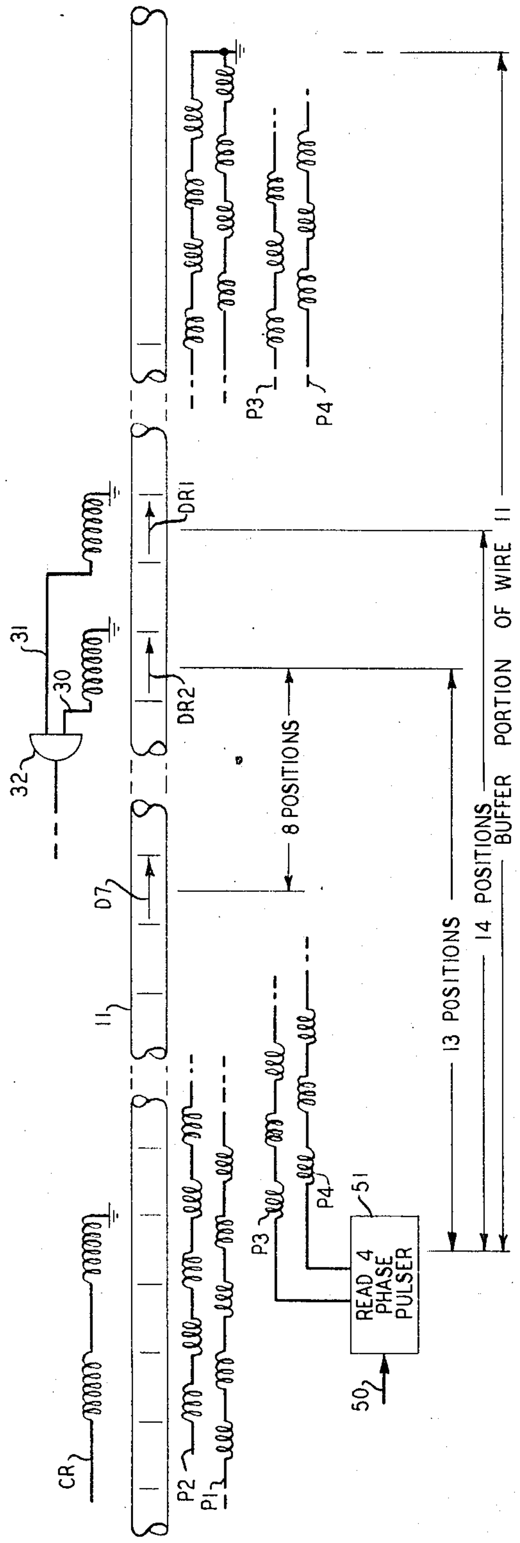

The propagation pulses advance the stored domains representing the input digit, illustratively a seven, into the buffer portion of the wire 11. When the reference domains DR1 and DR2 are advanced to the positions coupled by conductors 31 and 30, respectively, AND circuit 32 is activated and flip-flops 22 and 25 are reset. Note that flip-flop 25 provides a positive output voltage level on conductors 27 and 55 when in the set and reset conditions, respectively. The resulting positions of the domains are depicted in FIG. 3. The figure shows that conductors 30 and 31 couple wire 11, thirteen and fourteen positions beyond the initial position of the reference domain DR1. This positioning is necessary, inter alia, to provide room for the storage of a complete representation of a (decimal) digit (plus two reference positions) in the buffer portion of the wire. The positioning of conductors 30 and 31 also allows for a blank position to either side of the reference domains to avoid ambiguous reference indications (three reverse domains in a row) not only when a digit one is stored, as described, but also when a (next preceding) digit zero, indicating a ten, is stored.

Figure 7:
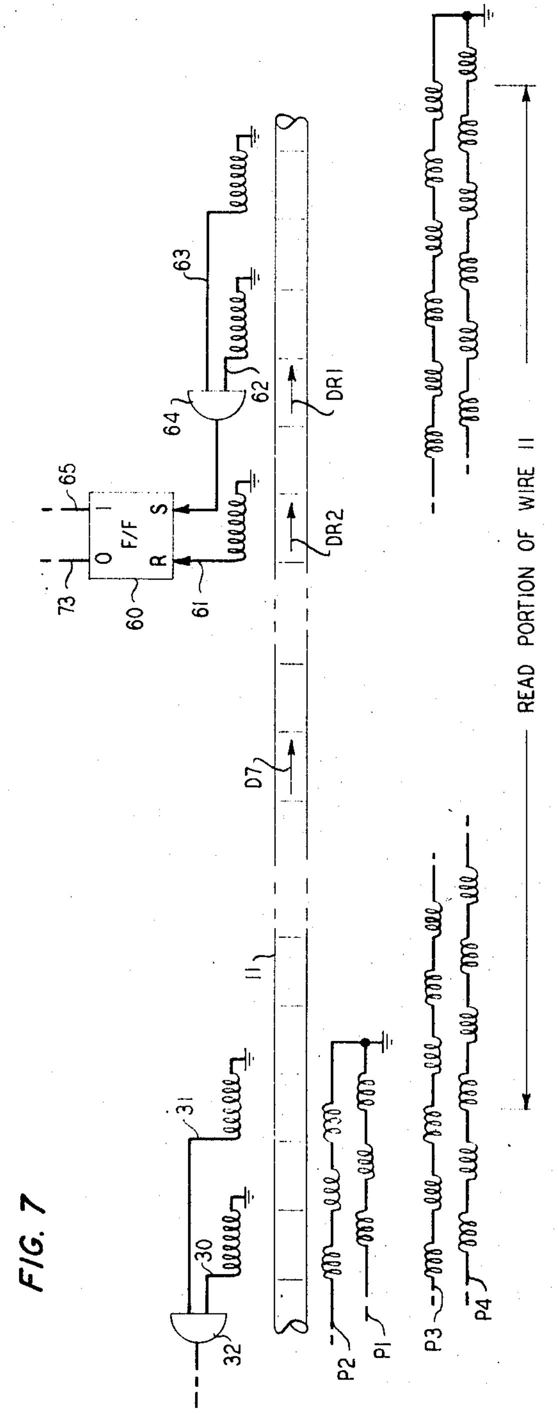

FIG. 3 shows conductors P1 and P2 extending through the buffer portion of wire 11 originating at pulser 18 (shown in FIG. 2) and terminating at ground. FIG. 3 also shows two additional conductors designated P3 and P4 originating at read pulser 51. Each of conductors P3 and P4 includes sets of coils exactly as does each of conductors P1 and P2. Whereas conductors P1 and P2 couple the write and buffer portions of wire 11 as shown in FIGS. 2 and 3, conductors P3 and P4 couple the buffer and read portions of wire 11. The termination of wires P3 and P4 at ground is illustrated in FIG. 7 in connection with which the read operation is discussed.

If a digit-accept command (pulse at 40) appears before stored information is advanced to the positions shown in FIG. 3, the command is ignored (actually stored first in flip-flop 42 and then in flip-flop 45 when AND circuit 42 is next enabled by a pulse from clock source 43). The reason for this is that for the digit-accept command to effect any result, it has to activate read pulser 51 and for this to happen, AND circuit 49 has to be enabled. AND circuit 49, however, is enabled only when flip-flop 25 is in a reset condition. The latter condition is provided only by the arrival of stored information at the positions shown in FIG. 3. A read operation initiated after stored information arrives at the positions shown in FIG. 3 is discussed hereinafter. For the moment, assume that the entire illustrative telephone number 722–2513 is stored prior to a read operation.

Figure 4:
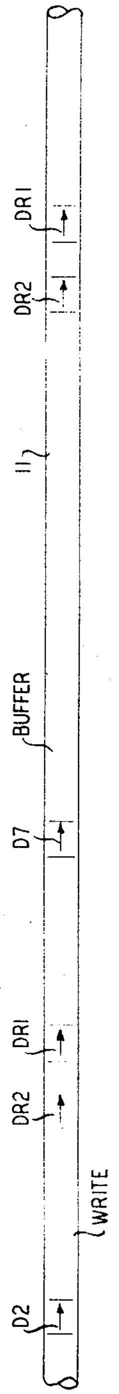

FIG. 4 depicts the positions of reverse domains for a seven and a two. It is clear that the pattern of reference domains repeats, a new pattern of domains D2 . . . DR2–DR1 appearing in the write portion of the wire 11 in response to the activation of conductors C2 and CR corresponding to operation of pushbutton 2 of the subscriber subset. The previous pattern for the seven remains unmoved in the buffer portion of the wire 11 while the digit 2 is being stored.

Figure 5:
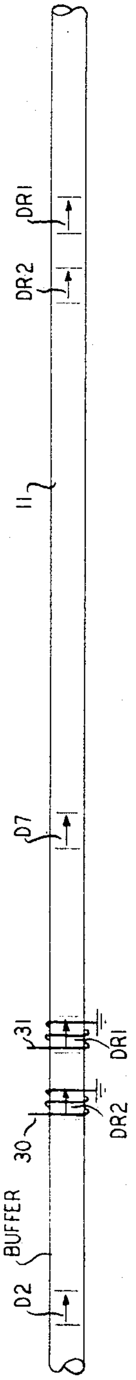

As before, all stored domains then are advanced to the right as viewed until the second set of reference domains DR2 and DR1 for the digit 2 arrive at the positions in the buffer portion coupled by conductors 30 and 31, as shown in FIG. 5, for resetting flip-flop 25 and permitting a read operation as already described.

Figure 6:
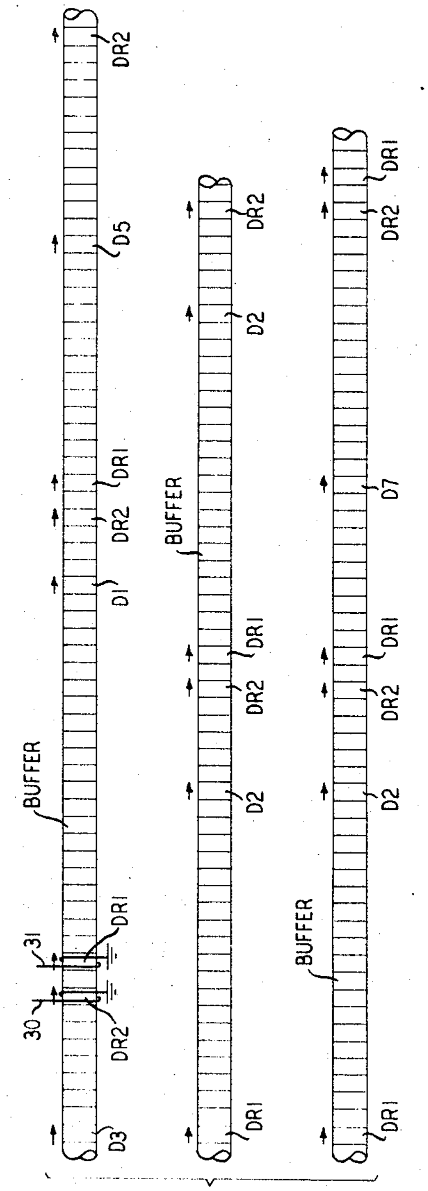

The entire called number is stored in this manner. The resulting pattern of reverse domains is shown in FIG. 6. The number of bit positions between each reference domain DR2 and the next following coded domain (less one) correspond to each of the stored digits in accordance with the illustrative number 722–2513 reading from right to left as viewed in FIG. 6.

We will now discuss a read operation and thereafter consider as yet unaccounted for write-read race conditions inherent in asynchronous arrangements.

FIG. 7 shows the buffer and read portions of domain wall wire 11. In response to a digit-accept command (pulse at 40), AND circuit 42 is enabled. A next pulse from clock source 43, then, sets flip-flop 45 for triggering (gated) read pulser 51 via AND circuit 49. Notice, flip-flop 25 is reset and AND circuit 49, thus, is enabled to this end. Stored information, for example, the pattern of reverse domains shown in FIG. 6, is advanced by means of four-phase pulse sequences applied by pulser 51 (see FIG. 3) to conductors P3 and P4. For simplicity, consider the advance of the representation of only the first digit, seven. When the reference domain DR1 of that representation reaches the position in the read portion of domain wall wire 11 coupled by conductor 61 (see FIG. 1), it induces a pulse therein for resetting flip-flop 60. Flip-flop 60, however, is already in a reset condition, as will become clear, and the pulse in conductor 61 is ignored.

Figure 8:
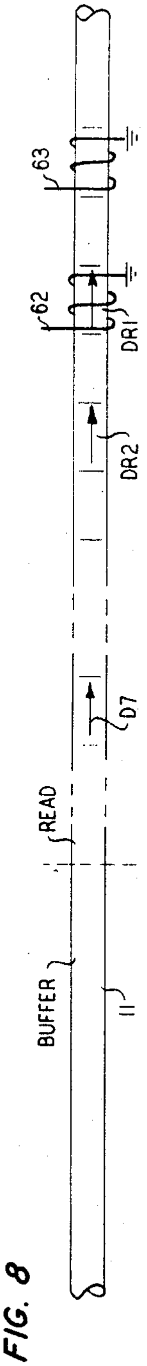
Figure 9:
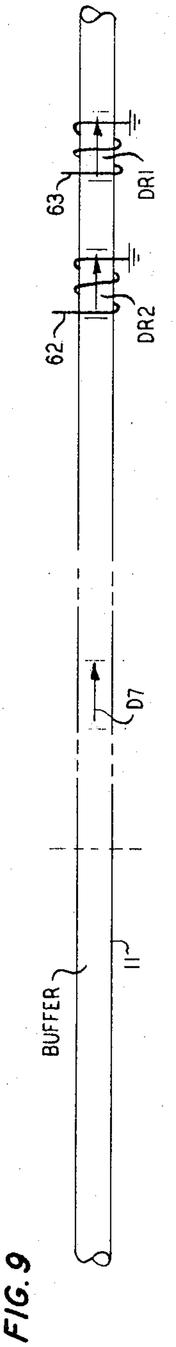

It is to be recalled that conductor 61, conveniently, couples a buffer region (not to be confused with buffer portion of wire 11) intermediate adjacent bit positions which are spaced four propagation pulses apart. Four pulses after domain DR1 passes the position in wire 11 coupled by conductor 61, domain DR2 passes the position coupled by conductor 61 to repeat the result provided by domain DR1 previously. Two pulses later domain DR1 arrives at the position coupled by conductor 62. The pulse induced in conductor 62 by that passing domain is neglected because AND circuit 64 is not enabled as is clear from FIG. 8. The advance of information continues until reference domains DR1 and DR2 arrive concurrently at the positions coupled by conductors 63 and 62, respectively, as shown in FIG. 9. At this juncture, those domains induce pulses in conductors 63 and 62 activating AND circuit 64, which in turn sets flip-flop 60. AND circuit 66 is already enabled via the output of AND circuit 49. Consequently, the (set) output level from flip-flop 60 appears as an output pulse at 69 for utilization by any compatible circuit (not shown) such as is supplied by a telephone central office. The pulse at 69 also resets flip-flop 45 through OR gate 70 terminating the advance of information when the concurrent four-phase propagation sequence ends. Delay line A prevents the setting of flip-flop 25 before that four-phase sequence terminates thus preventing pulser 18 from applying pulses prematurely.

Figure 10:
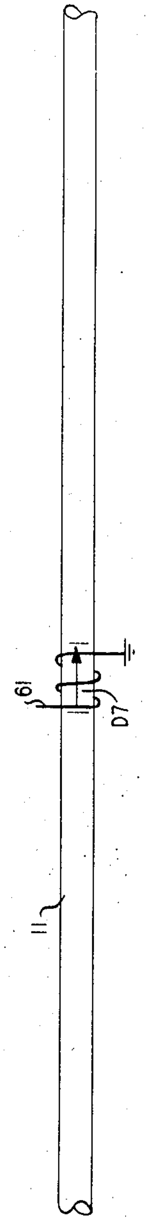

A next pulse from clock source 43 then, as before, sets flip-flop 45 and activates (gates four-phase) read pulser 51 via AND circuit 49. Flip-flop 60 is still in the set condition. Consequently, another output pulse is provided at 60 and flip-flop 45 is again reset terminating the advance of information at the end of one cycle of the four-phase propagation sequence. This action continues in response to each pulse from clock source 43 to provide an output pulse at 69 until the coded domain, for example D7, passes the position of wire 11 coupled by conductor 61 as shown in FIG. 10. At this time, a pulse is induced (by domain D7) in conductor 61 for resetting flip-flop 60. Flip-flop 60, via reset differentiator 72 in turn, pulses interdigit spacing circuit 74 to a no-output condition disabling AND circuit 42. To this end, interdigit spacing circuit 74 may be a monopulser. Since domain D7 is advanced seven positions (essentially) before it passes conductor 61, seven output pulses are provided at 69 in the manner just described. These pulses are the desired dial pulses. Read operations may continue as described providing additional sets of two, two, two, five, one, and three dial pulses, set apart by interdigit spacings, in response to digit-accept commands. The digit-accept commands (pulses at 40) are provided under the control of central office equipment (not shown) when such equipment is ready to accept the dial pulses of a digit as is known in the art.

The choice of a position for the coupling of conductor 61 to wire 11 becomes clear when the propagation of the representation of a digit –1– is considered. In that representation, the domain D1 is eight propagation pulses behind the reference domain DR2. Domains DR1 and DR2, respectively, couple conductors 63 and 62 before domain D1 couples conductor 61 to permit the setting of flip-flop 60 prior to the resetting thereof as described. Conductor 61, then, is positioned to reset flip-flop 61 as soon as practical after that flip-flop is set.

Figure 11:
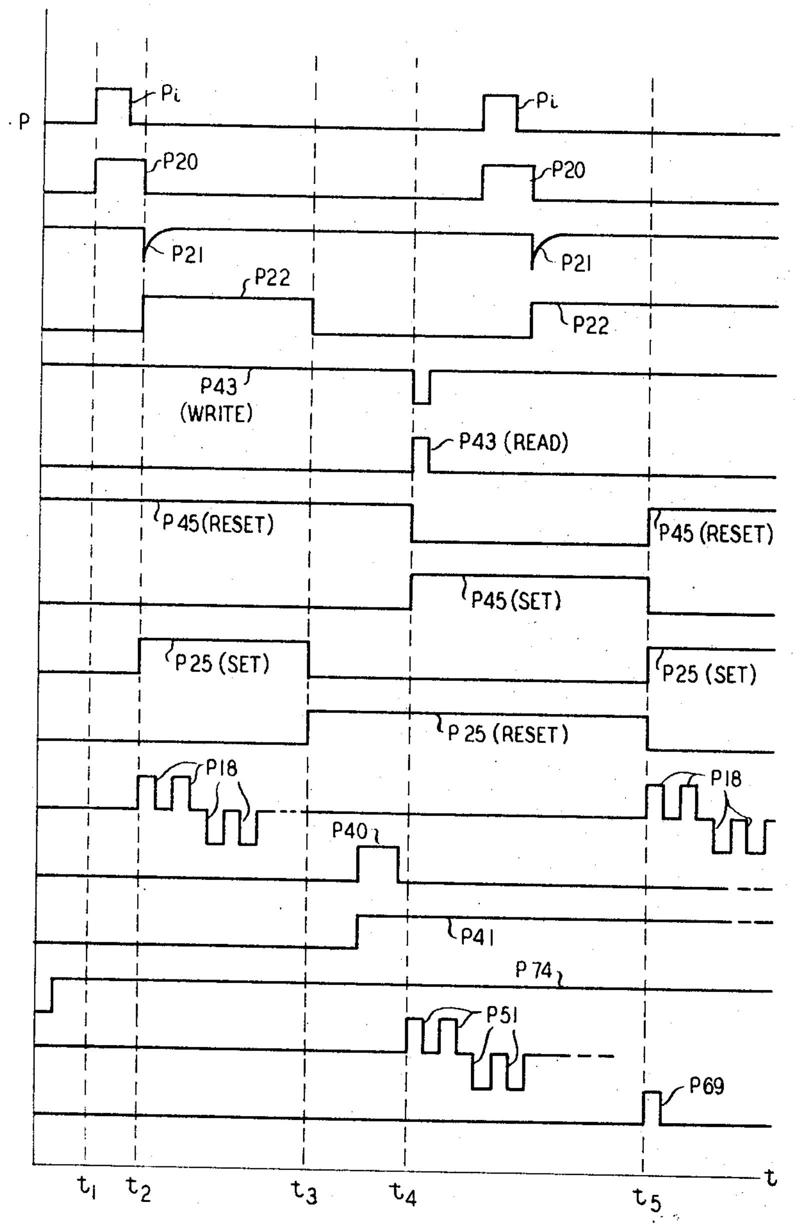
FIG. 11 is a pulse diagram of the operation of the circuit of FIG. 1.

The write and read operations may be summarized conveniently with reference to the pulse diagram shown in FIG. 11. The write operation is initiated, at a time designated $t1$, by a coded input pulse Pi in response to the depression of a subset pushbutton. The pulse designated P20 on conductor 20 is initiated at this time also. Differentiator 21 provides a pulse, designated P21, at a time $t2$ in response to the trailing edge of a pulse P20. Flip-flop 22, accordingly, is set. The clock source 43 is assumed to be enabling AND circuit 23 at this time. This is represented by the positive pulse form designated P43 (write) in FIG. 11. Flip-flop 45 is assumed to be in a reset state providing an output designated P45 (reset). Thus, flip-flop 25 (P25) also is set and pulser 18 is activated providing propagation pulses, designated P18. The propagation pulses are shown as two positive pulses followed by two negative pulses representing a propagation sequence. Such pulses are applied to propagation conductors P1 and P2 in a well-known manner and may begin with negative rather than positive pulses depending on the chosen direction of magnetization of a reverse domain and the location of a bit position with respect to the propagation couplings.

At a time designated $t3$, stored reverse domains reach the positions in the buffer portion of wire 11 coupled by conductors 30 and 31. Flip-flops 22 (P22) and 25 (P25) are reset at that time as already described. At a time thereafter, designated $t4$ in FIG. 11, a clock pulse P43 (read) and interdigit spacing circuit output P74 are assumed present. Also, a digit-accept command P40 is assumed to have activated flip-flop 41 providing an output P41 at this time. Accordingly, flip-flop 45 is set and propagation pulse sequences (P51) are applied via pulser 51. At a later time, designated $t5$, an output pulse P69 is provided resetting flip-flop 45. Had another input (Pi) arrived prior to time $t5$ as indicated, a write (actually advance-to-buffer) operation is provided (as at time $t2$) as soon as flip-flop 45 is reset.

In normal operation of the circuit of FIG. 1, write and read operations are interleaved. Clock source 43 operates to permit mutually exclusive write and read operations as has been mentioned hereinbefore. Should a write pulse P20 appear concurrently with a read clock pulse or during a read operation, flip-flop 22 functions to "remember" the pulse until the read operation terminates as indicated in the pulse diagram at time *t5*. The read clock pulse predominates because of the write delay provided by differentiator 21. Even if the delayed write pulse P20 and the read clock pulse are concurrent, AND circuit 23 is disabled and the read operation proceeds. Should a read clock pulse P43 (read) appear during a write operation, the pulse sets flip-flop 45 for initiating a read operation as soon as flip-flops 22 and 25 are reset. Accordingly, write and read operations are interleaved with no difficulty. A read clock pulse, advantageously, is of a duration of less than that of a four-phase propagation sequence to insure receiving only one output pulse for each clock pulse.

In the presence (and absence) of input information, monopulser M is triggered by each read clock pulse. After a time to permit normal (one pulse) read out, monopulser M, in response, provides a pulse for resetting flip-flops 41 and 45. This operation is to permit additional input even if a digit-accept pulse occurs in the absence of a previous input to the write portion of wire 11.

It is clear that interleaved write and read operations leave gaps between adjacent (decimal) digit representations in the magnetic wire. For example, a read operation prior to a storage of a "two" in the write portion of wire 11 as depicted in FIG. 4 would advance the representation of the (decimal) "seven" to the position shown in FIG. 9. The seven and the two are spaced apart a considerable distance, consequently. This is of little concern because output pulses are enabled by the reference domain of a digit representation and inhibited by the position coded domain of the corresponding representation in response to read clock pulses so that spaced apart information does not introduce ambiguities into the operation. Each of the buffer and read portions of wire 11 is capable of storing the entire called number. The two independent propagation means thus operate first, in response to write commands, to advance the representations, one by one, to a buffer portion of the magnetic wire where the representations form a queue and, second, in response to read clock pulses, to advance to the read portion of the wire all the information so queued in the buffer portion. The structure of the representations preserves the dial-pulse correspondence in each instance. Each domain providing an output as described collapses when it reaches the end of wire 11. A bias may be provided at the end of wire 11 to act as a domain sink.

It is also clear that such an arrangement provides independent write and read rates. For example, a typical dial pulse (read) rate may be ten pulses per second. A typical subscriber dialing rate is ten pulses per second maximum. Propagation pulses are applied at about a 500 kilocycle rate. From the foregoing typical pulse rates, it is also clear that a write operation between succeeding read operations does not space apart succeeding output pulses a sufficient time to provide a false output spacing indication which would, in turn, indicate an incorrect called number. Note that an input coded arrangement of domains may be provided at any time in response to a coded input. The advance of that arrangement may be delayed pending the termination of a read operation. The foregoing typical pulse rates indicate the negligible delays involved.

What has been described is considered to be only illustrative of the principles of this invention and it is to be understood that various and numerous other arrangements may be devised by one skilled in the art without departing from the spirit and scope thereof.

What is claimed is:

1. A magnetic circuit comprising a first magnetic medium including first and second spaced apart portions and an intermediate portion, means for writing stable magnetized conditions in said first portion and for reading said conditions at an output position in said second portion at rates independent of one another, said means comprising input means responsive to coded input signals for storing a position coded condition and a pair of reference conditions in said first portion, first propagation means for stepping said conditions from said first to said intermediate portion responsive to an input signal, second propagation means for stepping said conditions from said intermediate portion to said output portion responsive to a read signal, means for applying read signals to said second propagation means, means responsive to the arrival of a pair of reference conditions at an output position in said output portion for enabling output pulses in response to said read signals, means responsive to the arrival of a position coded condition at said output position for inhibiting further output pulses in response to further read signals.

2. A magnetic circuit in accordance with claim 1 wherein said magnetic medium comprises a magnetic domain wall wire and said stable conditions are reverse domains.

3. In a code converter, the combination comprising a domain wall wire including first, second and third portions, input means coupled to said first portion of said wire responsive to each code of a coded input signal for selectively nucleating a coded stable reverse domain in one of $n$ succeeding spaced apart positions of said first portion and for simultaneously nucleating first and second stable reference reverse domains at the $n$th+2 and $n$th+3 positions in said first portion, first propagation means for moving said reverse domains from said first to said second portion of said wire responsive to each code of said coded input signal, second propagation means responsive to read signals for moving said reverse domains from said second to said third portion of said wire, means for applying read signals to said second propagation means, output means responsive to said first and second reference domains for permitting output pulses in response to said read signals, and timing means responsive to said coded stable reverse domain for inhibiting further output pulses for a predetermined time.

4. The combination in accordance with claim 3 including first control means coupled to next adjacent positions in said second portion responsive to the arrival of said first and second reference domains there for inhibiting said first propagation means from so moving said domains and for permitting read signals to be applied to said second propagation means.

5. The combination in accordance with claim 4 wherein said first control means includes first and second couplings to the $n$th+3 and $n$th+4 positions in said second portion of said wire.

6. The combination in accordance with claim 5 including second control means responsive to said read signals for inhibiting said first propagation means from advancing said reverse domains from said first to said second portions of said wires and for enabling said second propagation means.

7. The combination in accordance with claim 6 wherein said output means includes first and second couplings to adjacent positions in said read portion responsive to the arrival of said reference domains there for enabling an output pulse in response to a first read signal.

8. The combination in accordance with claim 7 including means responsive to each output pulse for enabling said first propagation means and disabling said second propagation means.

9. The combination in accordance with claim 8 wherein said timing means comprises third control means responsive to the arrival of each of said coded domains at said output position for inhibiting read signals from activating said second propagation means for a predetermined time.

10. In combination, a magnetic medium of a material in which a reverse domain is generated in response to a first field in excess of a nucleation threshold and through which that reverse domain is propagated in response to a second field in excess of a propagation threshold and less than said nucleation threshold, said medium including first, second and third portions, means for writing stable magnetized conditions in said first portion, means for reading magnetized conditions in said third portion, said first and third portions defining said second portion therebetween, first propagation means for providing said second fields in a step-along manner through said first and second portions of said medium, and independent second propagation means for providing said second fields in a step-along manner through said second and third portions of said medium.

11. A combination in accordance with claim 10 including means for operating said first and second propagating means in a mutually exclusive manner in response to write and read signals respectively.

References Cited

UNITED STATES PATENTS 3,351,922 11/1967 Snyder ------------ 340—174

BERNARD KONICK, *Primary Examiner.*

G. M. HOFFMAN, *Assistant Examiner.*